Sept. 30, 1969     M. D. McNAMEE     3,469,881
CAMPER CONVERTED FROM PANEL TRUCK AND METHOD OF CONVERSION
Filed Oct. 7, 1968     2 Sheets-Sheet 1
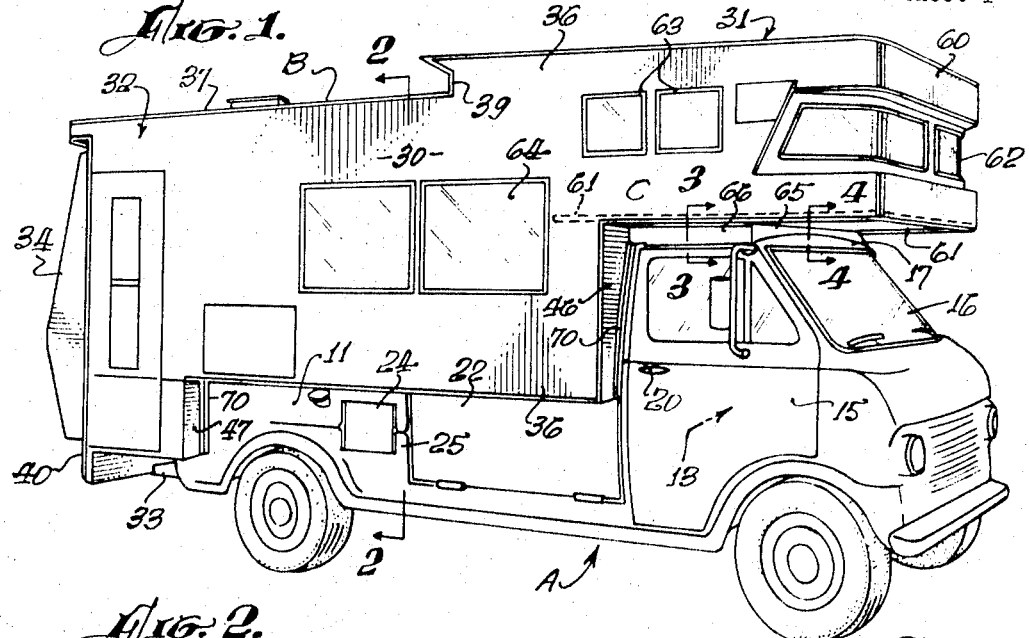
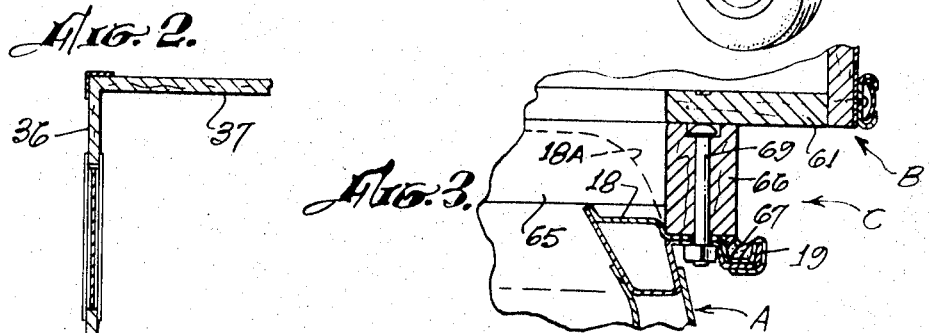
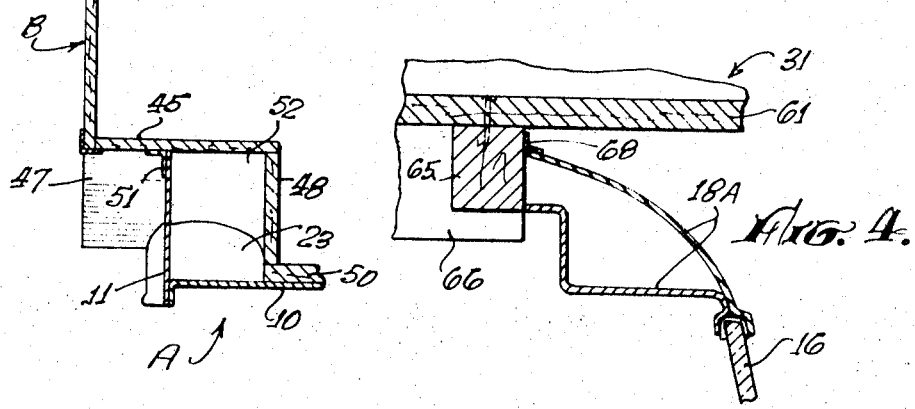
INVENTOR.
MERLE D. McNAMEE,
BY
Lynn H. Latta
ATTORNEY.

Sept. 30, 1969   M. D. McNAMEE   3,469,881
CAMPER CONVERTED FROM PANEL TRUCK AND METHOD OF CONVERSION
Filed Oct. 7, 1968   2 Sheets-Sheet 2
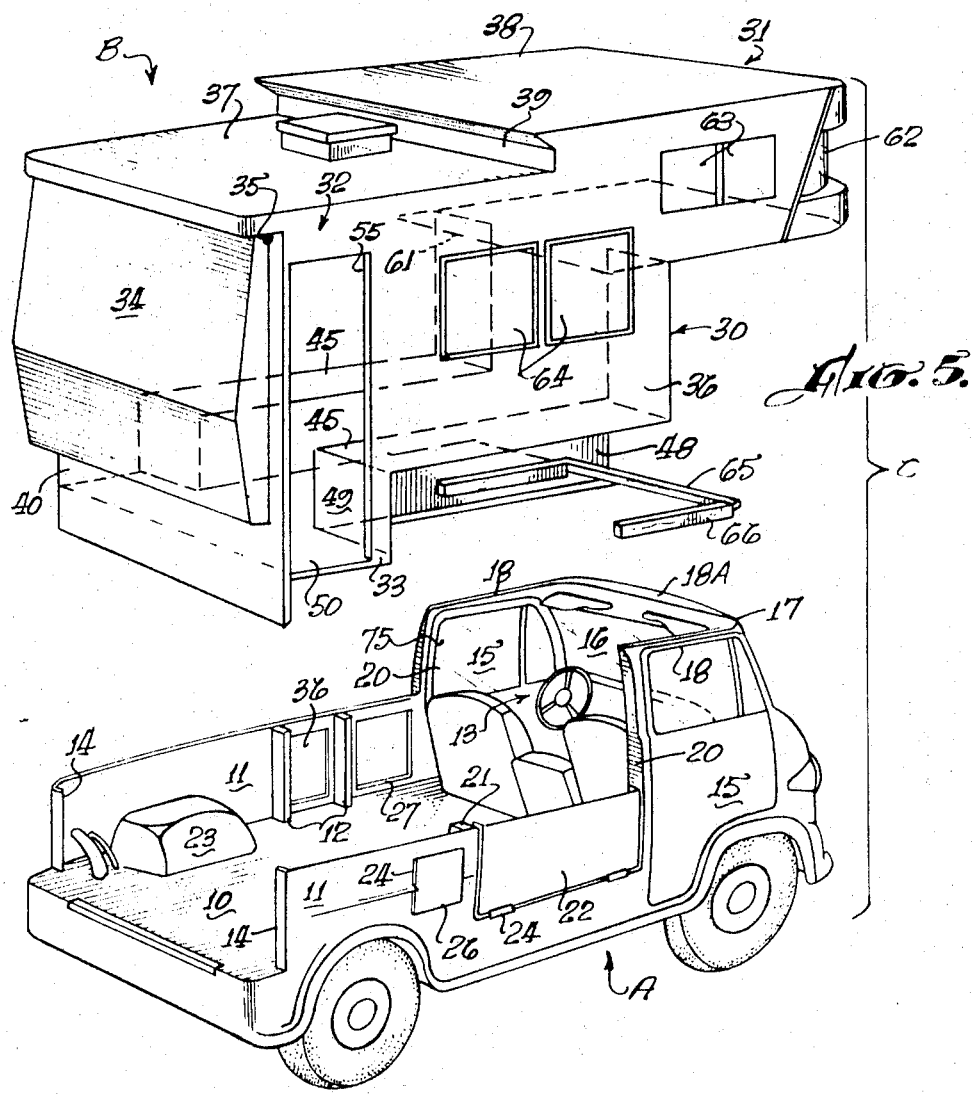
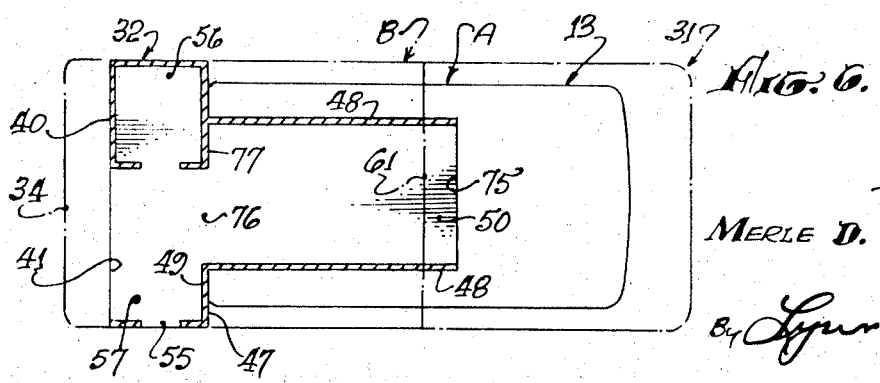
INVENTOR.
MERLE D. McNAMEE,
BY Lynn H. Latta
ATTORNEY.

3,469,881
CAMPER CONVERTED FROM PANEL TRUCK
AND METHOD OF CONVERSION
Merle Dwyer McNamee, Whittier, Calif.
(2501 Rosemead Blvd., El Monte, Calif. 91733)
Continuation-in-part of application Ser. No. 667,311,
Aug. 12, 1967. This application Oct. 7, 1968, Ser.
No. 765,402
Int. Cl. B60p 3/32, 3/34
U.S. Cl. 296—23          10 Claims

ABSTRACT OF THE DISCLOSURE

A mobile home of the camper type composed of a camper body combined with a panel truck so as to expand the space therein upwardly, laterally and rearwardly for a full complement of living quarter facilities.

RELATED APPLICATION

This application is a continuation-in-part of my pending application Ser. No. 667,311; filed Aug. 12, 1967.

BACKGROUND OF THE INVENTION

In the camper of my aforesaid pending application, a relatively shallow camper body top, with a depending rearward extension is superimposed upon and attached to a panel truck body which has had its roof cut away at a level slightly below the original ceiling level. The width of the attachment is restricted to the width of the panel truck body, and an architecturally pleasing overall body design is thereby attained.

Prior to this earlier panel truck camper, the common practice in camper construction has been to superimpose a camper body upon the shallow open bed of a pickup truck or a larger truck having the shallow open type of cargo-carrying body. In such campers the camper body has a front wall which is juxtaposed as close as possible to the rear of the driver's cab of the truck, but an unsightly space is inevitably left between the cab and the camper body. A very noticeable space also occurs between the top of the cab and the bottom of a forward portion of the camper body which overhangs the cab. The composite construction unavoidably has a makeshift appearance (of a box carried on a truck) and lacks homogeneity of body design.

RESUME OF THE INVENTION

The camper of this invention combines a panel truck with the upper portion of its body cut away for approximately half its height (or more) from its rear end forwardly to a vertical plane just behind the driver's compartment; and a camper body which includes inwardly offset longitudinally extending skirts which rest on the truck floor and are secured to the cut-down side panels of the truck, an expanded-width body, joined to the skirts by horizontal offset walls projecting laterally over the cut-down side panels and joined at the front to vertical cut edges of the driver's compartment which is left in the panel truck body, and an elevated forward sleeper section overhanging the driver's compartment (from which the roof has been cut away on a horizontal plane) and joined to the cut edges thereof, all of the cut edges being hidden by the attached camper body, and full open communication between the driver's compartment and the rearward area of the truck, and the camper body interior, being established.

OBJECTS OF THE INVENTION (1) To provide a camper with unrestricted communication between driver's compartment and living quarters;

(2) To provide increased roominess;
(3) To provide a body design of more integrated and pleasing appearance;
(4) To improve body strength and occupant protection;
(5) To provide rearwardly extended space beyond the rear end of the truck body;
(6) To provide externally-accessible utility compartments in spaces (not important for floor space) forwardly and rearwardly of the fender wells of the panel truck, for service tanks, utensils storage, etc.

These and other objects will become apparent in the ensuing specification and appended drawings.

In the drawings:

FIG. 1 is a perspective view of a camper embodying my invention;

FIG. 2 is a fragmentary vertical transverse sectional view taken on line 2—2 of FIG. 1;

FIG. 3 is a fragmentary vertical transverse sectional view taken on line 3—3 of FIG. 1;

FIG. 4 is a fragmentary vertical longitudinal sectional view taken on line 4—4 of FIG. 1;

FIG. 5 is an exploded perspective view of the components of the camper; and

FIG. 6 is a longitudinal sectional view of the camper in a horizontal plane, portions above the section plane being shown in phantom.

DETAILED DESCRIPTION

Referring now to the drawing in detail, and in particular to FIG. 5, I have shown therein, as an example of one form in which the invention can be embodied, a camper comprising, as its principal components, a cut-away panel truck A, a camper body B, and a header C which provides a joint between body B and the driver's compartment of truck A.

Panel truck A comprises a bed 10; side panels 11 cut down to approximately half (somewhat less than half) their original height, such panels embodying vertical strengthening ribs 12 and rear door posts 14; a driver's compartment 13 defined between opposed lateral front doors 15, a windshield 16, and a V-shaped eave frame 17, remaining after cutting away the roof of the truck above the driver's compartment 13. This front section of roof is removed (e.g. by using a cutting torch) in a horizontal plane just above the lateral doorway header beams 18 (FIG. 3) of doors 15, with the eave gutters 19 remaining along the sides of the beams 18.

From this horizontal plane, at the forward extremity thereof, a transverse cut is made in a vertical plane just behind the transversely-arched front header 18A of the truck roof, and from the rearward extremity of the horizontal plane of cut, the side panels of the truck body are cut away in a transverse vertical plane just behind the door posts 20 defining the rear sides of the doorways of these doors.

Where the panel truck has a side door or pair of side doors just behind one of the doors 15, the vertical plane is located along the rear side of the divider door post 20 at that side of the truck. The vertical cuts extend from the roof level down to a level approximately (somewhat more than) halfway from the roof to the floor of the truck. From the bottom of the vertical cut, horizontal cuts are made along the respective side panels, leaving approximately half the height of the side panels 11 projecting upwardly from bed 10. The rear doorpost 21 (FIG. 5) of these side doors is cut down to the same height as panel 11, and the divider post between these side doors is cut away entirely to provide a double-width opening which is closed by a drop-door 22 hinged to the door sill along its lower margin.

The floor space of bed 10 is narrowed where the fender wells 23 project inwardly of panels 11. The spaces forwardly and rearwardly of the fender wells (which are of little value as floor space) are utilized to accommodate storage lockers, tanks (e.g. butane tank) etc. which are made accessible from the exterior by the door 22 and cover plates 24 set into openings 25, 26 and 27 cut in the side panels 11.

The camper body B is fabricated as a unit which is superimposed upon the truck A, secured thereto, and sealed to the cut edges thereof. In general, it comprises an intermediate main body section 30, a forwardly projecting, elevated sleeping compartment 31, a rear extension section 32 having a portion 33 thereof projecting downwardly to floor level below the full-width portion of main body section 30, and optionally, a folding bed unit including a housing 34 hinged at 35 along its upper margin to the upper rear corner of main body section 30 and normally hanging in a vertical position as shown so as to function as a closure for the rear end thereof, and a bed (not shown) normally stored in a vertical position within housing 34 and foldable downwardly to a horizontal position when housing 34 is swung rearwardly to an extended position, thus to provide a bed sheltered by the extended housing 34. Since the folding bed unit is not an essential part of the invention, it is not disclosed in detail.

Camper body sections 30, 31 and 32 have common side walls 36; main section 31 and rear extension section 32 have a common roof 37; and forward elevated section 31 has a roof 38 which extends rearwardly over the forward area of main body section 30 and is joined to roof 37 by a transverse vertical offset wall 39. A rear wall 40 (which may have a suitable bed-access opening 41 (FIG. 6) where folding bed unit 34, 35 is utilized), closes the rear end of the camper, or cooperates with bed housing 34 in doing so.

The camper body B is of a greater width than the body of panel truck A, and its sides over hang the sides of the truck. Extending inwardly from the lower margins of sidewalls 36 are horizontal offset walls 45 (FIGS. 2 and 5) which are joined at their forward and rear ends to vertical offset walls 46 and 47 (FIGS. 1 and 2) extending inwardly from the vertical margins of side walls 36 at the forward extremities of main body section 30 and rear extension section 32. Longitudinal skirts 48 and transverse skirts 49 (FIG. 5) extend downwardly from attached overhanging inner and rear marginal portions of offset walls 45 and are mounted upon a floor panel 50 which rests upon truck bed 10 (FIG. 2). The offset walls 45 are secured by means of angle bars 51 to the marginal upper portions of truck side panels 11, and thus reinforce and position the cut panels, preventing them from spreading laterally under the load of the superimposed camper body B. As thus reinforced, the side panels 11 cooperate with the truck bed 10 in supporting the weight of the camper body B, the offset walls 45 being supported partially by the upper marginal portions of truck panels 11 and partially by the skirts 48, 49 and floor panel 50, resting upon the truck bed 10. Between the skirts 48 and side panels 11 are defined utility spaces 52 to receive tanks etc. or to provide storage compartments. Transverse skirts 49 are abutted against the rear door posts 14 and can be secured thereto by any suitable securing elements, to reinforce the attachment between the camper and truck bodies. Skirts 49 may be integral extensions of vertical offset walls 47 (FIG. 6).

Floor 50 has a width substantially equal to the transverse distance between fender wells 24 and such as to fit between them. In plan it is T-shaped, its rear area being extended laterally at both sides, to the side walls 36. The side wall 36 at one side has a narrow doorway 55 (FIG. 5) providing external access to the rear body section 32, in which are accommodated a shower stall 56 (FIG. 6) and an entry way 57.

Elevated forward sleeper section 31 (FIG. 1) has a front wall 60 and a floor 61 which is sealed to and functions as a cover for the cut-away top of driver's compartment 13. Floor 61 extends rearwardly a short distance beyond the driver's compartment 13, as indicated in phantom in FIGS. 1 and 5, so as to provide sleeping quarters of double-bed width. Suitable windows 62, 63, 64 are provided in the front and sides of front body section 31 and in the sides of main body section 30.

Header yoke C comprises a bridge bar 65 and lateral arms 66 extending rearwardly from the ends thereof. Bridge bar 65 has its forward face fitted against the cut rear edge of front header bar 18A and arms 66, which are of greater depth than bridge bar 65, are seated against the horizontal cut upper edges of door header beams 18. The header yoke C is sealed to the eave frame 17 of the truck by suitable sealing compound 67 (FIG. 3) injected into gutters 19 at the sides of frame 17, and by a suitable seal strip 68 (e.g. of angle section) attached to forward and upper faces of bridge bar 65 and header bar 18A respectively. Yoke C is securely anchored to the eave frame 17 by bolts 69 extended downwardly through arms 66 and through the shoulders of gutters 19, on which the arms 66 rest. Yoke C is secured (e.g. by nailing) to the under face of floor 61 of forward sleeper section 31.

Suitable sealing strips 70 are also attached to the joints between the inner margins of vertical and horizontal offset walls 46, 47 and 45 (FIG. 1) and the adjoining surfaces of truck side panels 11, thus weather-proofing the interior of the camper.

Between the rear door posts 20 of the driver's compartment and below the floor 61 of the overhead section 31 of the camper body B, an opening 75 (FIGS. 5 and 6) provides access between the driver's compartment 13 and the living quarters within main body section 30, the full width between the forward ends of skirts 48. Floor area of the same width extends from this opening back to the rear section 32, where an opening 76 communicates with entry 57 and shower stall 56. Above the level of horizontal offset walls 45, the room area within main body section 30 expands to the full width of section 30. Seats may be provided on one or both offset walls 45 (e.g. by covering cushions) and one of them may support kitchen utilities such as stove and ice box, and may have a sink mounted therein, with a suitable waste receptacle in the utility storage space 52 underneath.

The camper body B is secured to truck A along the top side margins of the driver's compartment 13 by the attachment of yoke C side arms 66 to door headers 18 (FIG. 3); along the upper margins of cut-away truck side panels 11 (except along door 22) by angle bars 51; and along the rear door posts 14 by fastening means (e.g. bolts) directly connecting the forward faces of offset walls 47, 49 of the rear extension section 32 of the camper body to the posts 14. The connection to door posts 14 provides transverse bracing between the rear extremities of truck side panels 11 and closes the rear door opening of the panel truck (the full-width rear portion of floor 50 being seated against a substantial area of bed 10 projecting rearwardly of posts 14—FIG. 5).

An important advantage of the invention over the conventional camper utilizing a pickup truck bed for the bottom of the camper body, is the full communication between the front of the camper body and the driver's cab, in contrast to the lack of communication existing in the conventional camper. While it is possible to cut a door opening in the back of the cab and to connect it to a doorway in the front end of the camper body, such construction adds considerable expense to the cost of conversion, and complicates the conversion. The present invention avoids such extra expense and complications.

Shower stall 56 is separated from the interior of main body section 30 by a partition wall 77 which projects beyond the adjoining offset wall 45, toward the opposite side of section 32, from which it is spaced so as to define doorway 76.

I claim:
1. In combination with a panel truck comprising a body including a bed and side panels rising from the sides of said bed to a level substantially below roof level, and a driver's compartment including lateral and front enclosure members, at least a major portion of the roof and portions of the side panels of said truck having been cut away and removed in a horizontal plane intersecting said side panels;

and a camper body superimposed upon and attached to said panel truck body and comprising:
  a major body section including a full-width upper portion covering the cut-down side panels and projecting laterally outwardly thereover, and including offset horizontal walls projecting inwardly from the lower margins of said upper portion, and skirts extending downwardly in longitudinal and transverse planes respectively, from the inner sides and rear ends of said offset walls, said skirts resting on said truck bed;
  a forward sleeper section projecting forwardly over said driver's compartment as a forward extension of said full-width upper portion and communicating with the interior thereof;
  and a rear extension section having a full-width lower portion projecting downwardly along the rear ends of said cut-down side panels and secured thereto so as to provide lateral bracing therefore and to close the space therebetween.

2. The combination defined in claim 1, wherein said panel truck roof is cut away from its full length, including the area thereof over said drivers compartment, in a horizontal plane of cut immediately below roof level and substantially above the upper edges of the cut-away side panels,
  said driver's compartment including an eave frame of U-shape in plan, constituting the upper extremities of said enclosure members, said sleeper section including a floor attached and sealed to said eave frame and closing the top of said driver's compartment.

3. The combination defined in claim 2, including a U-shaped header yoke secured to the under face of said sleeper section floor, said yoke including side arms mounted on the side members of said eave frame and a bridge bar abutting the forward member of said eave frame and providing a weather-proof joint between said sleeper section and said driver's compartment.

4. The combination defined in claim 3, wherein said forward eave frame member is severed from said panel truck roof in a vertical plane extending upwardly from said horizontal plane of cut above said driver's compartment, and has its cut rear edges abutted against the forward face of said bridge bar.

5. The combination defined in claim 4, wherein said eave frame side members include gutters and shoulders adjoining the inner sides thereof;
  said header yoke side members resting upon and being secured to said shoulders and overhanging said gutters;
  and sealing compound contained in said gutters and sealing the under faces of said header yoke side members to said eave frame.

6. The combination defined in claim 1, wherein said offset horizontal walls project inwardly from said cut-down side panels above said truck bed;
  and wherein said longitudinal skirts are spaced inwardly from said cut-down side panels so as to define utility spaces extending along said side panels;
  and openings in said side panels, for excess to said utility spaces from the exterior of the camper.

7. The combination defined in claim 1, including a shower stall within one side of said rear extension section and including a partition wall separating the same from said main body section;
  a doorway providing communication between said main body section and said rear extension section, being defined between said shower stall and the opposite side of said rear exterior section.

8. The combination defined in claim 1, including a shower stall within one side of said rear extension section and including a partition wall separating the same from said main body section;
  a doorway providing communication between said main body section and said rear extension section, being defined between said shower stall and the opposite side of said rear exterior section;
  an entry in said opposite side of said rear extension section;
  and a door in the side wall of said rear extension section, in said opposite side thereof, for external access to said extension section.

9. The combination defined in claim 1, wherein said offset horizontal walls project both inwardly and outwardly from said cut-down side panels and rest upon and are secured to the upper margins thereof;
  said longitudinal skirts being spaced inwardly from said side panels and cooperating therewith to support the weight of said camper body.

10. The combination defined in claim 1, wherein said offset horizontal walls project inwardly from said cut-down side panels above said truck bed;
  wherein said truck body includes fender wells projecting inwardly from said cut-down side panels above and joined to said bed;
  and wherein said longitudinal skirts are spaced inwardly from said cut-down side panels in vertical planes adjacent the inner extremities of said fender wells, so as to assist in supporting the camper body and to define utility spaces extending along said side panels, for accommodating utility appliances and providing storage facilities;
  and doors in said side panels, providing access to said utility spaces from the exterior of the camper.

References Cited
UNITED STATES PATENTS 3,356,407  12/1967  McGarry _____ 296—23
3,248,083  4/1966  Gennaro _____ 296—23 X PHILIP GOODMAN, Primary Examiner U.S. Cl. X.R.
296—27